United States Patent
Roy

(10) Patent No.: US 8,613,064 B1
(45) Date of Patent: Dec. 17, 2013

(54) METHOD AND APPARATUS FOR PROVIDING A SECURE AUTHENTICATION PROCESS

(75) Inventor: Jayanta Roy, Pune (IN)

(73) Assignee: Symantec Corporation, Mountain View, CA (US)

( * ) Notice: Subject to any disclaimer, the term of this patent is extended or adjusted under 35 U.S.C. 154(b) by 642 days.

(21) Appl. No.: 12/241,372

(22) Filed: Sep. 30, 2008

(51) Int. Cl.
*H04L 29/00* (2006.01)

(52) U.S. Cl.
USPC ............... 726/7; 713/155; 713/156; 713/157; 713/158; 713/159; 380/247; 380/248; 380/249; 380/250

(58) Field of Classification Search
USPC ............... 713/155–159; 380/247–250
See application file for complete search history.

(56) References Cited

U.S. PATENT DOCUMENTS

| | | | |
|---|---|---|---|
| 6,321,338 B1 * | 11/2001 | Porras et al. | 726/25 |
| 6,405,318 B1 * | 6/2002 | Rowland | 726/22 |
| 2005/0188222 A1 * | 8/2005 | Motsinger et al. | 713/201 |
| 2006/0282660 A1 * | 12/2006 | Varghese et al. | 713/155 |
| 2007/0157315 A1 * | 7/2007 | Moran | 726/23 |
| 2007/0220595 A1 * | 9/2007 | M'raihi et al. | 726/5 |

* cited by examiner

*Primary Examiner* — Ghazal Shehni

(74) *Attorney, Agent, or Firm* — Wilmer Cutler Pickering Hale and Dorr LLP

(57) ABSTRACT

A method and apparatus for providing a secure authentication process is described. In one embodiment, a method for a method for providing a secure authentication process includes monitoring login activity of at least one authentication process associated with a computer resource and analyzing the login activity to identify suspicious login activity associated with user credentials.

21 Claims, 4 Drawing Sheets

METHOD AND APPARATUS FOR PROVIDING A SECURE AUTHENTICATION PROCESS

BACKGROUND

1. Field of the Invention

Embodiments of the present invention generally relate to identity security systems and, more particularly, to a method and apparatus for detecting suspicious login activity to provide a secure authentication process.

2. Description of the Related Art

With the development and progression of computers, people have become internet savvy and spend a significant amount of time browsing the Internet to communicate with other people (e.g., through instant messages and emails), conduct research (e.g., through educational websites, digital libraries and expert discussion forums), perform business applications. Such an increase in Internet usage has led more and more people to make transactions online (e.g., online securities trading and bank account management and/or the like).

While online transactions are easy and simple, people risk misappropriation of valuable credentials (e.g., a login id, a password, a credit card number and/or the like) from being stolen and/or misused. The people, using websites for online transactions, are often apprehensive about their genuineness and credibility. In most websites, users are recognized (e.g., based on a cookie and the like) before they login. As a result, the user's credentials are accessible to other illicit users, and hence, are at risk. As such, the illicit user can log on and misuse the user credentials. Consequently, authentication techniques are utilized to ensure protect legitimate users that conduct online transactions.

Current authentication techniques utilize an authentication user interface. But the authentication user interface is dumb and merely collects credentials and validates these credentials. Further, the current authentication techniques can not differentiate between authentic login activity and suspicious login activity made by the illicit user. In addition, the illicit user may steal and/or use a system file (e.g., a .crd file) provided by the identity provider and may try to pass through the authentication process to login to the website that is cookie enabled. In addition, the user may forget to delete credential information from the computer after making online transactions. The illicit user can take an advantage in the absence of the legitimate user.

Therefore, there is a need in the art for a method and apparatus for detecting suspicious login activity to provide a secure authentication process.

SUMMARY OF THE INVENTION

Embodiments of the present invention comprise a method and apparatus for providing a secure authentication process. In one embodiment, a method for a method for providing a secure authentication process includes monitoring login activity of at least one authentication process associated with a computer resource and analyzing the login activity to identify suspicious login activity associated with user credentials.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
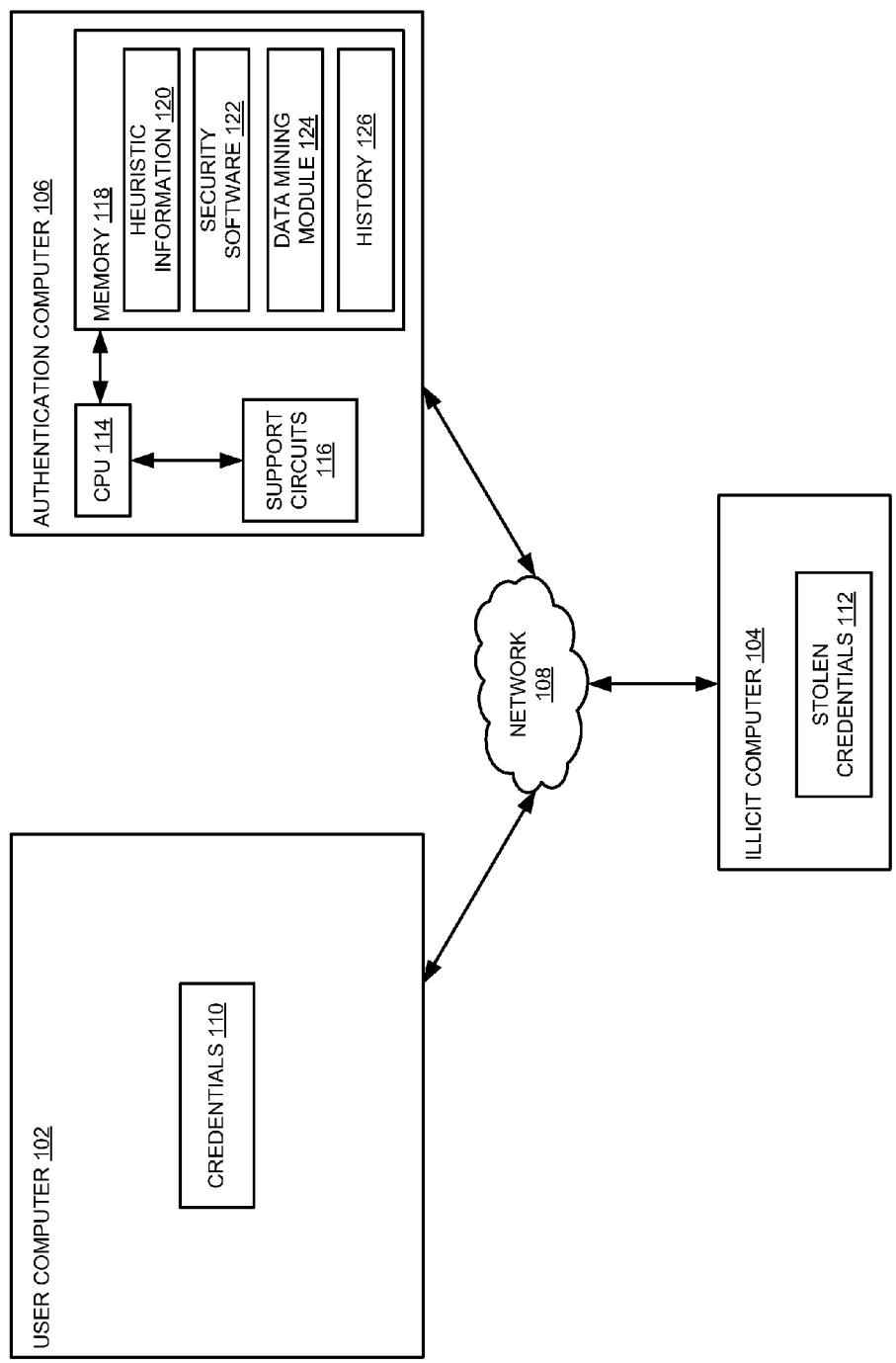
FIG. 1 is a block diagram of a system for providing a secure authentication process according to one or more embodiments of the present invention.

FIG. 1 is a block diagram of a system 100 for providing a secure authentication process according to in one embodiment. The system 100 comprises a user computer 102, an illicit computer 104 and an authentication computer 106, each coupled to each other through a network 108.

The user computer 102 is a type of computing device (e.g., a laptop, a desktop, a Personal Digital Assistant (PDA), a mobile phone and/or the like), such as those generally known in the art. The user computer 102 includes the credentials 110. According to various embodiments of the present invention, the credentials 110 are various kinds of user information (e.g., login id, password, credit card number and the like). In one or more embodiments, a user of the user computer 102 utilizes the credentials 110 to make an online transaction.

The authentication computer 106 is a type of computing device (e.g., a laptop, a desktop, a Personal Digital Assistant (PDA) and/or the like), such as those generally known in the art. The authentication computer 106 includes a Central Processing Unit (CPU) 114, various support circuits 116, and a memory 118. The CPU 114 may comprise one or more commercially available microprocessors or microcontrollers that facilitate data processing and storage. The support circuits 116 facilitate the operation of the CPU 114 and include one or more clock circuits, power supplies, cache, input/output circuits, and the like. The memory 118 comprises at least one of Read Only Memory (ROM), Random Access Memory (RAM), disk drive storage, optical storage, removable storage, and the like. The memory 118 includes various data, such as heuristic information 120 and a history 126. Further, the memory 118 includes various software packages such as security software 122 and a data mining module 124.

The illicit computer 104 is a type of computing device (e.g., a laptop, a desktop, a Personal Digital Assistant (PDA), a mobile phone and/or the like), such as those generally known in the art. Generally, the illicit computer 104 may be utilized by a hacker with an intention to steal information from the user of the user computer 102. The illicit computer 104 stores such information for future misappropriation. In one embodiment, the hacker uses the illicit computer 104 to locate and misappropriate various credentials (e.g., online credentials for accessing and utilizing web sites) from a number of computer users and store such credentials as stolen credentials 112.

The stolen credentials 112 may be similar to the credentials 110 as described above. In one embodiment, the hacker may further misappropriate the stolen credentials 112 by conducting fraudulent online transactions to enrich themselves. As explained further below, the security software 122 prevents such misappropriation by providing a user interface that detects suspicious login activity and notifies the user of the user computer 102 that the credentials 110 may be compromised. In one embodiment, the authentication computer 106 ceases to accept the credentials 110 from any computer in order to protect the user.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

According to various embodiments of the present invention, the history 126 maintains information regarding login activity related to the user computer 102. In one embodiment, the history 126 includes a login name and/or a password utilized by the user to make one or more online transactions (e.g., fantasy baseball, online checking accounts at commercial banking websites and/or the like). In one or more embodiments, the history 126 captures login activity for each authentication process associated with the credentials 110.

According to various embodiments of the present invention, the history 126 maintains date and time information (e.g., in a local time zone) for each authentication process. In one or more embodiments, the history 126 maintains date and time information for each successful login using the credentials 110. In another embodiment, the history 126 includes date and time information for each cancellation or invalidation of the authentication process. In a yet another embodiment, the history 126 stores a number of times that an invalid user id and/or password is entered during every authentication process. In addition, the history 126 stores an Internet Protocol (IP) address of computer the user computer 102.

In one embodiment, the heuristic information 120 is an algorithm to identify suspicious login activity. In one embodiment, the heuristic information 120 may be hard coded into the security software 122. As explained below, the heuristic information 120 may be used to detect suspicious login activity. For example, the heuristic information 120 may indicate that a previous login was invalid and suspicious because an authentication process was cancelled after three invalid password attempts.

According to various embodiments of the present invention, the data mining module 124 utilizes various data mining techniques (e.g., an association rule mining technique, a sequence mining and the like) to determine a behavioral pattern that are unique to the user of the user computer 102. In one embodiment, the data mining module 124 examines the history 126 using a machine learning technique to determine the behavioral pattern associated with the credentials 110. For example, the data mining module 124 may utilize an association rule mining technique to determine the behavioral pattern for the user of the user computer 102 in form of an IP address range where a login time varies from one IP address to another IP address. Hence, any considerable deviation between the IP address and the associated login time indicates a suspicious login.

According to one or more embodiments, the security software 122 is configured to perform the authentication process. In one embodiment, the security software 122 authenticates the credentials 110 and permits access to one or more resources. In one embodiment, the security software 122 performs a second authentication process when a significant deviation is detected between current login activity at a first authentication process and the history 126. In another embodiment, the security software 122 notifies the user of the user computer 102 about the suspicious login activity.

In one embodiment, the security software 122 provides the history 126 to the user of the user computer 102. As such, the user of the user computer 102 may monitor the login activity manually to detect one or more fraudulent logins from unsuspicious, successful login activity. Furthermore, the security software 122 may provide an un-editable (i.e., read-only) copy of the history 126 to ensure that the history 126 may not be corrupted or altered (e.g., by malicious software to further fraudulent purposes). Hence, the security software 122 enables manual fraudulent login activity detection by the user.

In one or more embodiments, the security software 122 communicates a warning (e.g., a message, such as an email message or an instant message) to the user of the user computer 102 with respect to the suspicious login activity. In one embodiment, the warning indicates a degree of the suspicious login activity (e.g., high-level warning, medium-level warning, low-level and/or the like). In addition, the user may customize one or more warnings in a profile. Hence, the profile is used to determine an appropriate warning for particular suspicious login activity.

As an example and not as a limitation, the security software 122 issues the warning to the user of the user computer 102 based on a difference between a particular authentication process initiation time and a particular successful authentication time that deviates from the history 126. In one embodiment, the warning may be a low-level warning, which indicates that the login is valid but suspicious because the difference between the particular authentication process initiation time and the particular successful authentication time is four minutes, which is a considerable amount of time to simply enter the credentials 110 (e.g., a password).

In one or more embodiments, the security software 122 communicates a warning (e.g., a message) based on a difference between a particular authentication process initiation time and a particular authentication process cancel time that deviates from the history 126. In one embodiment, the warning may be a medium-level warning, which indicates that a previous login attempt is invalid and/or suspicious because an authentication process was idle and cancelled after four minutes, which is a considerable amount of time to simply enter the credentials 110 (e.g., a password).

According to various embodiments of the present invention, the security software 122 communicates a warning to the user of the user computer 102 based on one or more invalid login requests. For example, an invalid login request may be a previous authentication process where an invalid user id and/or password. In one embodiment, the warning may be a low-level warning, which indicates that the authentication process cancelled after three invalid login requests using the credentials 110 (e.g., the password). In another embodiment, the warning may indicate a successful login after two invalid login requests.

Thus, various embodiments of the present invention prevent hackers from misappropriating user credentials (e.g., a login name and password) for accessing one or more resources (e.g., accounts) by blocking otherwise successful login requests due to one or more deviations from a behavior pattern. As explained above, the behavior pattern indicates typical login activity exhibited by the user. If the login activity of the hacker deviates from behavior pattern, any login attempt by the hacker may be blocked even though the correct user credentials are entered in an authentication process. Simply stated, the user credentials are not sufficient for the hacker to successfully complete the authentication process because the login activity associated with the hacker does not correspond with the behavior pattern exhibited by the user. Thus, the hacker cannot successfully login with only the login name and/or the password because the hacker is not the user and cannot behave like the user.

Figure 2:
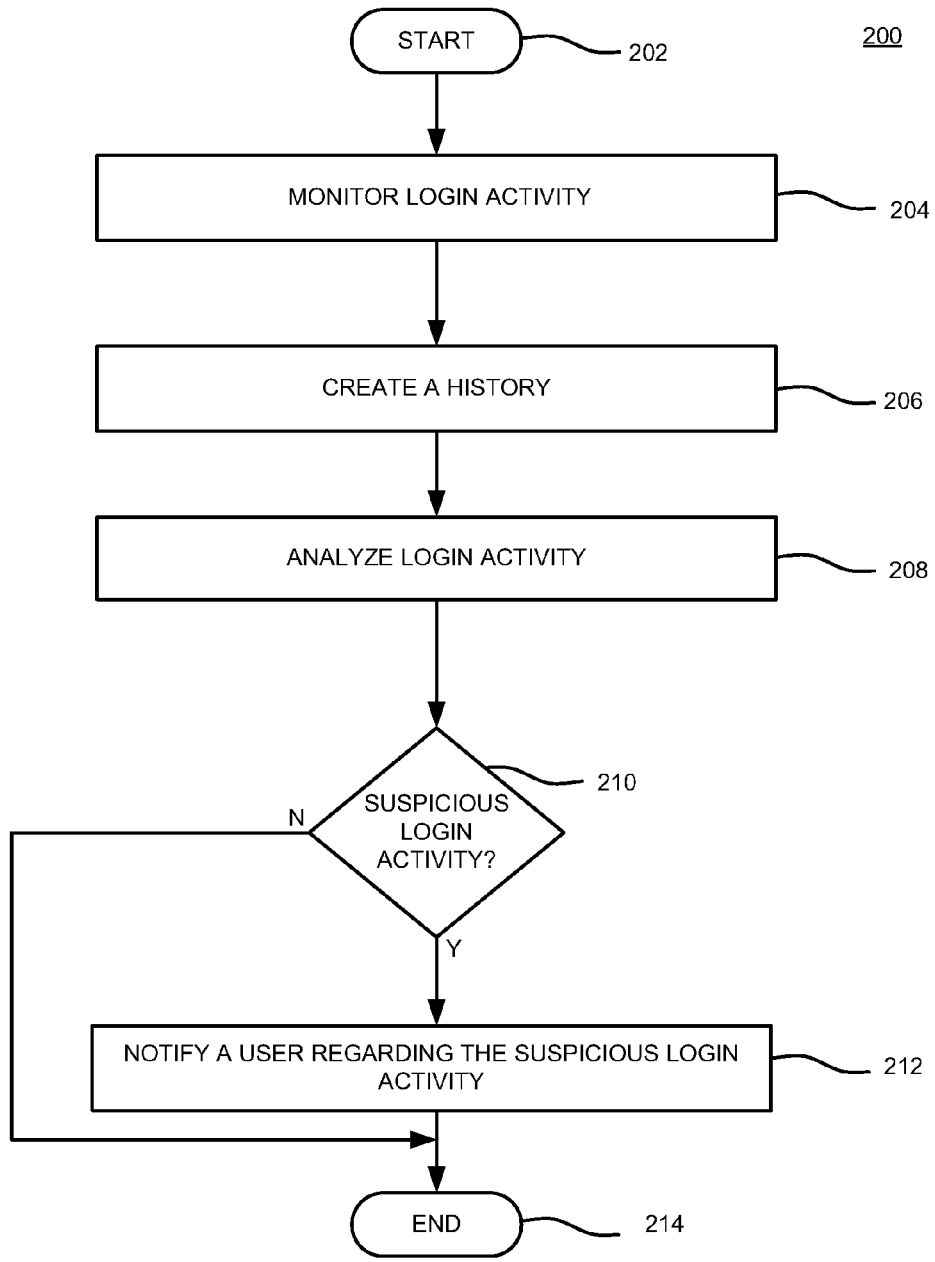
FIG. 2 is a flow diagram of a method for providing a secure authentication process according to one or more embodiments of the present invention.

FIG. 2 is a flow diagram of a method 200 for providing a secure authentication process according to one or more embodiments of the present invention. The method 200 starts at step 202 and proceeds to step 204, at which login activity is monitored. In one embodiment, the login activity is associated with an online resource (e.g., a checking account, a social networking account and/or the like).

At step 206, a history (e.g., the history 126 of FIG. 1) is created. In one or more embodiment, login activity for each authentication process is captured and stored in the history. At step 208, the login activity is analyzed. In one embodiment, the login activity is analyzed to determine a behavior pattern, which is used to identify suspicious login activity. At step 210, a determination is made as to whether there is suspicious login activity based on the history. If, at step 210, it is determined that there is no suspicious login activity (option "NO"), then the method 200 proceeds to step 214, where the method 200 ends. If it is determined that there is suspicious login activity based on the history (option "YES"), then the method 200 proceeds to step 212. At step 212, a user is notified regarding the suspicious login activity and the method 200 proceeds to step 214. For example, a warning message (e.g., an email message, an instant message and/or the like) is generated on a computer screen and presented to the user. At step 214, the method 200 ends.

Figure 3:
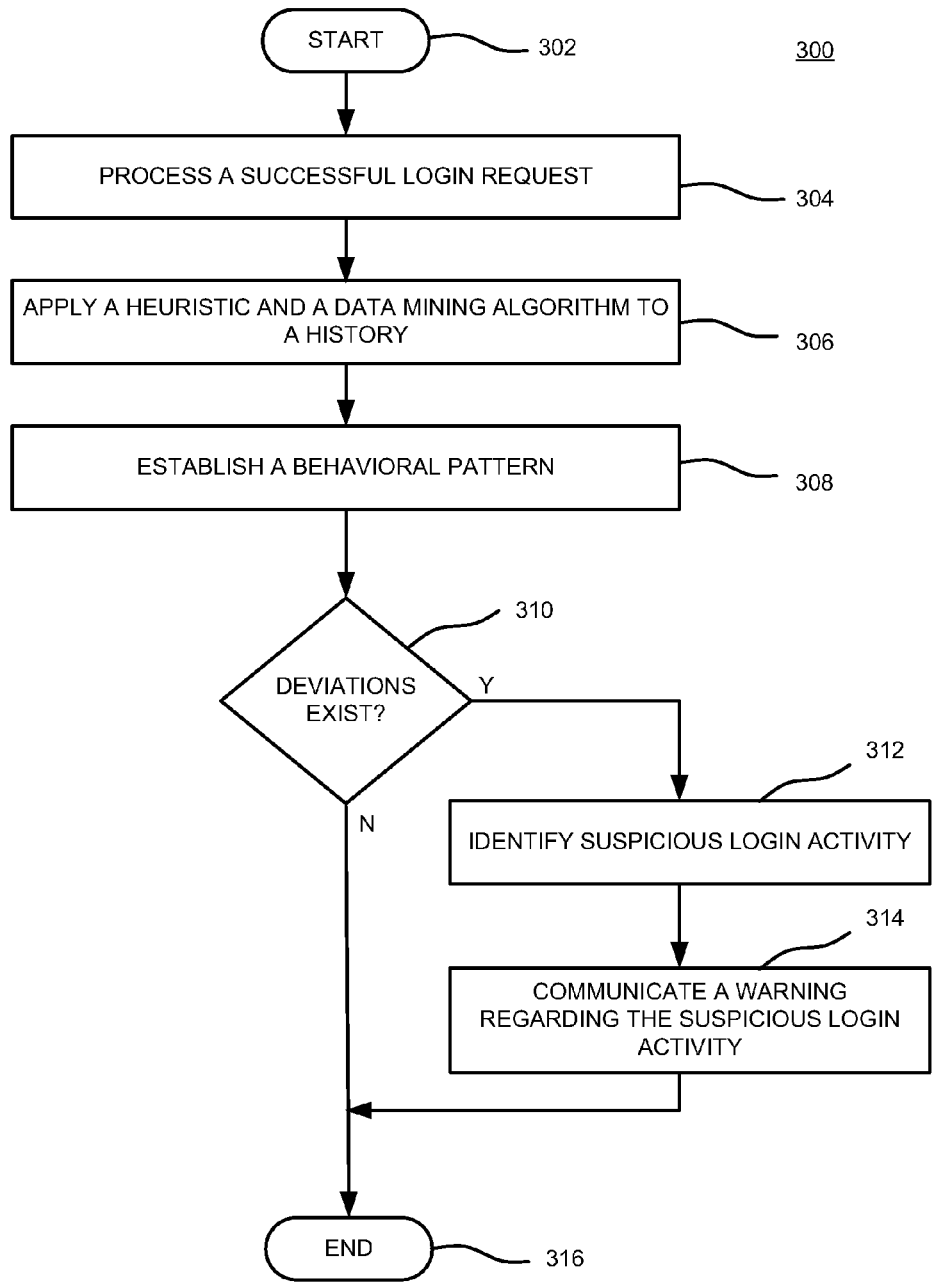
FIG. 3 is a flow diagram of a method for analyzing a history to detect suspicious login activity according to one or more embodiments of the present invention.

FIG. 3 is a flow diagram of a method 300 for analyzing a history to detect suspicious login activity according to one or more embodiments of the present invention. The method 300 starts at step 302 and proceeds to step 304, at which a successful login request is processed. At step 306, a heuristic (e.g., the heuristic information 120 of FIG. 1) and a data mining algorithm (e.g., an algorithm implemented by the data mining module 126 of FIG. 1) are applied to a history (e.g., the history 126 of FIG. 1). At step 318, a behavioral pattern is established. For example, the method 300 establishes the behavior pattern based upon monitored login activity, such as date and time information related to the user entering a login id and a password as well as an IP address associated with each authentication process.

At step 310, a determination is made as to whether one or more deviations from the behavioral pattern exist. If it is determined that there are one or more deviations from the behavioral pattern (option "YES"), then the method 300 proceeds to step 312. At step 312, suspicious login activity is identified. In one embodiment, the deviation from the behavioral pattern may include a difference between date and time information related to login activity of a particular authentication process and average date and time information that exceeds a pre-defined value. For example, the user that usually enters a login id and a password in one minute takes four minutes to enter the login id and the password. A deviation of three minutes indicates suspicious login activity because it is highly unlikely that the user needs four minutes to enter the login id and the password. At step 314, a warning regarding the suspicious login activity is communicated. If at step 310, it is determined that there are no deviations from the behavior pattern, then the method 300 proceeds to step 316, where the method 300 ends.

Figure 4:
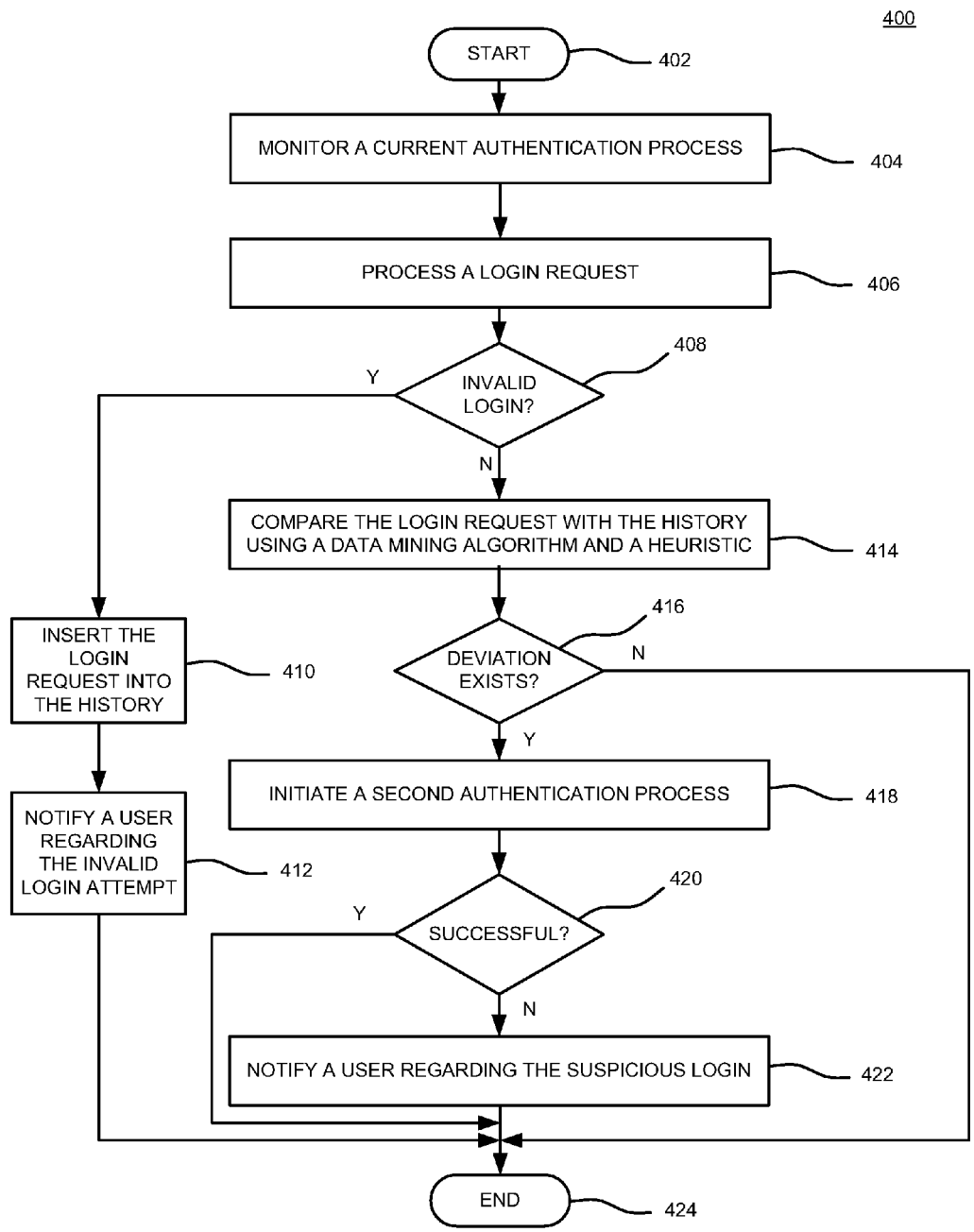
FIG. 4 is a flow diagram of a method for processing a current authentication process to identify suspicious login activity according to one or more embodiments of the present invention.

FIG. 4 is a flow diagram of a method 400 for processing a current authentication process to identify suspicious login activity according to one or more embodiments of the present invention. The method 400 starts at step 402 and proceeds to step 404, at which the current authentication process is monitored. In one embodiment, the authentication process is associated with a computer resource.

At step 406, a login request is processed. For example, the login request may include a login id and a password. At step 408, a determination is made as to whether the login request is invalid. If it is determined that the login request is invalid, the method 400 proceeds to step 410. For example, an incorrect password may be entered several times before the authentication process is aborted. As another example, a number of login requests may reach a maximum as specified in the user profile. At step 410, the login request is inserted into the history. At step 412, a user is notified regarding the invalid login request. For example, an email message is sent to the user. Then, the method 400 proceeds to step 424 where the method 400 ends.

If it is determined that the login request is valid, the method 400 proceeds to step 414. At step 414, the login request is compared with the history using a data mining algorithm and a heuristic. In one embodiment, the method 400 compares date and time information within the login request with a behavioral pattern based on the history associated with the user. As described above, the history is updated per authentication process. Therefore, a single authentication process may include multiple login requests.

At step 416, a determination is made as to whether one or more deviations exist based on the history. If, it is determined that there are no deviations (option "NO"), then the method 400 proceeds to step 424. If at step 416, it is determined that one or more deviations exist based on the history (option "YES) then the method 400 proceeds to step 418. At step 418, a second authentication process is initiated. In one embodiment, the user may define a profile that specifies a number of challenge questions to be used for the second authentication process. Furthermore, the profile may also specify a number of login requests before the authentication process is aborted. At step 420, a determination is made as to whether the second authentication process is successful. If the second authentication process is successful, the method 400 proceeds to step 424. If the second authentication process is not successful, the method 400 proceeds to step 422. At step 422, a user is notified regarding the suspicious login. The method 400 proceeds to step 424 where the method 400 ends.

Thus, various embodiments of the present invention have been provided. The inventive methods and apparatus may advantageously provide a secure authentication process. The inventive methods and apparatus may further be utilized to notify a user about one or more suspicious login activity. In one embodiment, the inventive apparatus advantageously minimizes online credential misappropriation.

While the foregoing is directed to embodiments of the present invention, other and further embodiments of the invention may be devised without departing from the basic scope thereof, and the scope thereof is determined by the claims that follow.

The invention claimed is:

1. A computer implemented method for providing a secure authentication process, comprising:
    monitoring login activity of at least one authentication process associated with a computer resource;
    establishing a behavioral pattern associated with a user, wherein the behavioral pattern is determined by an association rule mining technique configured to identify at least one user login time associated with at least one IP address, wherein the at least one user login time is the time elapsed when the user attempts to access the computer resource;

analyzing, via at least one computer processor, the login activity to identify suspicious login activity associated with the user, wherein a user login is compared against the behavioral pattern and the suspicious login activity comprises a deviation in user login time to access the computer resource; and communicating at least one of a high-level, medium-level, and low-level warning associated with the suspicious activity, wherein the at least one of a high-level, medium-level, and low-level warning may be customized by a user.

2. The computer implemented method of claim 1, wherein monitoring the login activity further comprises recording the login activity to create a history associated with the user.

3. The computer implemented method of claim 2, wherein monitoring the login activity further comprises processing a login request that comprises a login id, a password and date and time information.

4. The computer implemented method of claim 3, wherein analyzing the login activity further comprises comparing the login request with the history to identify the suspicious login activity.

5. The computer implemented method of claim 2, wherein analyzing the login activity further comprises applying a heuristic to the history to identify at least one invalid login request associated with the user.

6. The computer implemented method of claim 5 further comprising notifying a user regarding the at least one invalid login request.

7. The computer implemented method of claim 2, wherein analyzing the login activity to further comprises analyzing the history to identify the suspicious login activity associated with the user.

8. The computer implemented method of claim 7, wherein analyzing the history further comprises applying a data mining algorithm to the history to establish a behavior pattern associated with the history.

9. The computer implemented method of claim 8, wherein analyzing the login activity further comprises comparing recorded login activity of each authentication process of the at least one authentication process to the behavior pattern to determine at least one deviation.

10. The computer implemented method of claim 9, wherein analyzing the login activity further comprises comparing the at least one deviation to a pre-defined value to identify the suspicious login activity.

11. The computer implemented method of claim 10 further comprising communicating a warning to a user of the user, wherein the warning is configured such that the user customizes at least one degree of the suspicious login activity.

12. The computer implemented method of claim 8, wherein analyzing the login activity further comprises comparing login activity of a current authentication process to the behavior pattern to produce a comparison result.

13. The computer implemented method of claim 9, wherein comparing the login activity of the current authentication process further comprises determining at least one deviation from the behavior pattern based on the comparison result.

14. The computer implemented method of claim 10 further comprising initiating a second authentication process for accessing the computer resource.

15. The method of claim 14, further comprising defining a profile that specifies at least one challenge question to be used in the second authentication process.

16. The computer implemented method of claim 1 further comprising generating a notification regarding the suspicious login activity.

17. An apparatus for providing a secure authentication process, comprising:

a computer including at least one computer processor; and security software, executed by the at least one computer processor, for monitoring login activity of at least one authentication process associated with a computer resource and analyzing the login activity to identify suspicious login activity associated with a user, establishing a behavioral pattern associated with a user, wherein the behavioral pattern is determined by an association rule mining technique configured to identify at least one user login time associated with at least one IP address, such that the at least one user login time is the time elapsed when the user attempts to access the computer resource, wherein a user login is compared against the behavioral pattern and the suspicious activity comprises a deviation in user login time to access the computer resource, and communicating at least one of a high-level, medium-level, and low-level warning associated with the suspicious activity, wherein the at least one of a high-level, medium-level, and low-level warning may be customized by a user.

18. The apparatus of claim 17 further comprising a data mining module for applying a data mining algorithm to a history to establish a behavior pattern associated with the user, wherein the history maintains information regarding the monitored login activity of the at least one authentication process.

19. The apparatus of claim 18, wherein the security software compares login activity of a current authentication process to the behavior pattern to determine at least one deviation from the behavior pattern.

20. The apparatus of claim 17, wherein the security software communicates a warning to a user of the user, wherein the warning is configured such that the user customizes at least one degree of the suspicious login activity.

21. A system for providing a secure authentication process, comprising:

a user computer associated with a user; and an authentication computer coupled to the user computer, comprising:

a data mining module for applying a data mining algorithm to a history to establish a behavior pattern associated with the user, wherein the history maintains information regarding monitored login activity of at least one authentication process for at least one user associated with at least one IP address, and security software for monitoring the login activity of the at least one authentication process associated with a computer resource to create the history and analyzing the history using the behavior pattern to identify suspicious login activity associated with the user, wherein the at least one authentication process is compared against the behavior pattern, wherein the suspicious activity comprises a deviation in user login time to access the computer, and communicating at least of a high-level, medium-level, and low-level warning associated with the suspicious activity, such that the at least one user login time is the time elapsed when the user attempts to access the computer resource, wherein the at least one of a high-level, medium-level, and low-level warning may be customized by a user.

* * * * *